Oct. 2, 1934.  C. L. FITZ  1,975,141

COMPOUND PRISM BLOCK FOR CAMERAS

Filed April 28, 1932

Inventor:
Charles L. Fitz
By Williams, Bradbury,
McCaleb & Hinkle Attys.

Patented Oct. 2, 1934

1,975,141

UNITED STATES PATENT OFFICE 1,975,141

COMPOUND PRISM BLOCK FOR CAMERAS

Charles Leo Fitz, Chicago, Ill.

Application April 28, 1932, Serial No. 607,924

3 Claims. (Cl. 88—1)

My invention relates generally to cameras and more particularly to improved compound prism blocks for use in three-color cameras.

It is an object of my invention to provide an improved arrangement of prisms for use in three-color cameras to separate the light rays passing through the lens of the camera into three groups, each substantially equal in intensity and each corresponding to the complete objective being photographed.

A further object is to provide a compound prism having an improved form of partially reflecting and partially transmitting surface.

A further object is to provide an improved film guiding mechanism for three-color cameras.

A further object is to provide an improved film guide plate construction for three-color cameras.

A further object is to provide an improved means for forming three separate images from a single light image, each image being identical in every detail but of lesser light intensity than the original image.

A further object is to provide an improved three-color camera which is extremely simple in construction, may be easily operated by an amateur and which may be economically manufactured.

Figure 1:
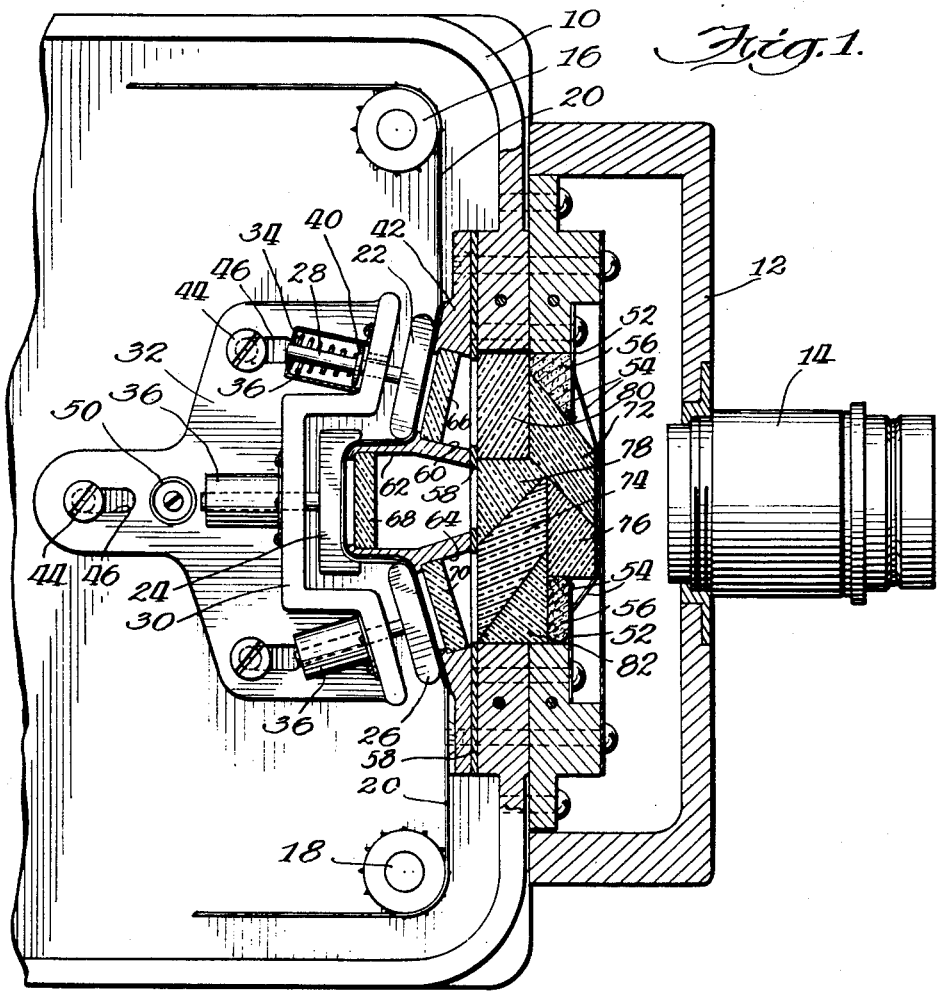
Figure 2:
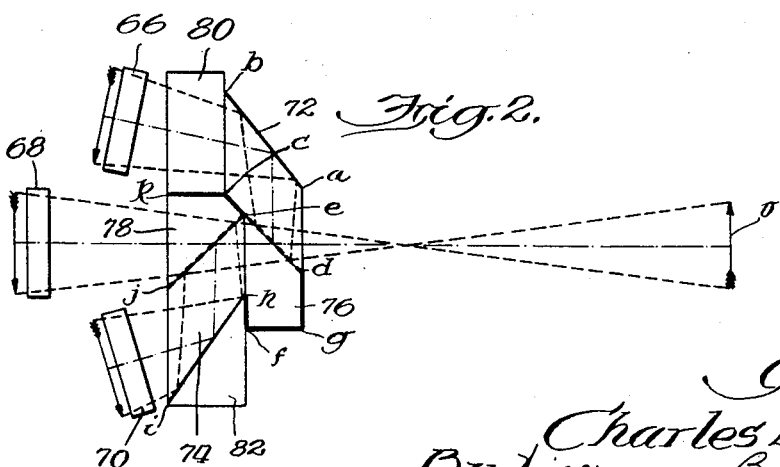

Other objects will appear from the following description, reference being had to the accompanying drawing, in which:

Figure 1 is a central vertical sectional view of a portion of a camera incorporating my improved compound prism block, and Figure 2 is an optical diagram of the prism blocks.

While it has been proposed, in the past, to use compound prism blocks for cameras adapted for three-color photography, such proposals have not proved practical, in view of the fact that it is necessary to have a partially reflecting and partially transmitting prism surface and, for practical purposes, this surface should be at an approximate angle of 45° to the light rays. When it is endeavored to provide a prism surface partially reflecting and partially transmitting light incident at an angle of 45°, it is found that the surface of the prism itself acts as a substantially perfect reflector.

In the compound prism of my invention, I have overcome the difficulty due to this property of prisms and have otherwise improved the construction and arrangement of the compound prism, so that substantially equal distribution of light to the three images is obtained.

In the accompanying drawing, I have illustrated a camera comprising a case 10 having a shutter housing 12 secured thereto. The shutter housing also carries the lens barrel 14, which may be of suitable construction and may be provided with any suitable adjusting and focusing means. The camera is provided with the usual film feeding means, including a pair of sprockets 16 and 18. The film 20 is fed over the sprocket 16 in front of resiliently held guide plates 22, 24 and 26. Each of the guide plates has a pin 28 rigidly secured thereto, the pin being guided for reciprocation in a sidewardly projecting flange 30 formed integrally with a plate 32. Each of the plungers is normally arranged resiliently to press its guide plate forwardly against the film, a compression coil spring 34 being provided for this purpose. This spring has one end abutting against the top of a cap 36 which is rigidly secured to the flange 30, and its other end abutting against the flange 40 formed on the pin. It will be noted that the guide plates 22 and 26 have convexly rounded film guiding edges, whereas the edges of the plate 24 are concavely rounded. The film is pressed forwardly by the guide plates against a suitable guide 42 having spaced guiding surfaces which engage the edge portions of the film. The plate 32 is slidably mounted upon the side wall of the camera case by means of studs 44, which project through slots 46 in the plate. A locking bolt, which is arranged to be manipulated by a knob 50, is provided to hold the plate 32 in the position shown.

The compound prism assembly, hereinafter described in detail, is held in the camera by means of a pair of clips 52, each having a plurality of spring fingers 54. These spring fingers, through felt pads 56, and directly, press the prism assembly against an apertured plate 58. The apertures in the plate 58, are in registry with openings 60, 62 and 64 formed in the casting 42, the latter having color filters 66, 68 and 70 suitably secured therein. In the preferred form of my invention, I use blue, red and green filters, the filter 66 being blue, the filter 68 being red, and the filter 70 being green. A suitable shutter mechanism (not shown) is adapted to be mounted within the housing 12.

The prism assembly comprises six right prisms, two being reflecting prisms 72, 74, three being transmitting prisms 76, 78, 80, and one being a filler prism 82. The prisms 72 and 74 are preferably made of flint glass and the prisms 76, 78 and 80 made of crown glass, or vice versa, to reduce chromatic aberration. Since the filler prism 82 does not transmit or reflect any of the light, it may be made of any desired material.

The prisms 72 and 74 are generally similar in shape, the prism 74, however, being slightly larger than the prism 72. The bases of these prisms 72, 74 are quadrilateral in shape. In the prism 72, the sides *ad* and *cd* are at an angle of 45° and, similarly, in the prism 74 the sides *eh* and *ej* are at an angle of 45°. The sides *ab* and *ad* of the prism 72 are at an angle of 141° 10′, the angles *abc* being 38° 50′, and the angle *bcd* being 135°. In the prism 74, the angle *ehi* is 143° 25′, the angle *hij*, 36° 35′ and the angle *eji*, 135°. It will therefore be apparent that the sides *ab* and *cd* of the prism 72, and the sides *ej* and *hi* of the prism 74, diverge slightly in the direction of light travel.

While the prisms need not be of exactly the shape specified, I have found that prisms of these shapes give good results.

The prism 72 has the portion *ed* of its sides *cd* covered with an extremely thin film of silver, or other suitable reflecting material. The coating is preferably applied to this surface by a process of chemical deposition which results in a very uniform coating, the thickness of which may be predetermined. The film of silver upon the surface *ed* is sufficiently thick so that it will reflect approximately one-third of the light incident upon it.

Since a prism of flint or crown glass will reflect all of the light directed to pass from it to air, at an angle of incidence greater than 37° to 43°, I have excluded air by securing the prism 76 to the side *ed* of the prism 72 by means of Canada balsam cement. The index of refraction between the glass and this cement being less than that between glass and air, the critical angle of incidence is correspondingly greater, so that, if it were not for the reflecting coating of silver, no part of the whole cone of light would be reflected. The surface *ab* of the prism 72 is fully silvered so as to be a substantially perfect reflector. The surface *ce* has a light-absorbing coating applied thereto.

Similarly, the prism 74 has a partially reflecting and partially transmitting surface *ej* and a substantially perfect reflecting surface *hi*. The silvering on the surface *ej* is of such density that approximately one-half of the light incident thereon will be reflected and the other one-half transmitted thereby.

The surfaces *dg*, *fg* and *fh* of the prism 76, and the surface *ck* of the prism 78, are preferably coated with a black substance so that they will absorb any stray light rays.

As diagrammatically shown in Fig. 2, the light from an object *o* will be broken into two components upon striking the surface *cd* of the prism 72, approximately one-third of the light being reflected to the total reflecting surface *ab* and thereafter passing through the rectangular prism 80 and color screen 66 to the film.

The light transmitted through the surface *ed* strikes the surface *ej* at an angle of approximately 45° and is, in part, transmitted and in part reflected by this surface. Approximately one-half of the light incident upon the surface *ej* will pass to the prism 78, and the other one-half will be reflected to the silvered surface *hi*, from which it is totally reflected through the color screen 70 to the film 20. The light which is transmitted to the prism 78 will pass through the color screen 68 to the film.

If, due to the fact that the color filters 66, 68, 70 act in part as density filters, equal distribution of light upon the three record portions of the film is not obtained, the ratio of light reflected to the light transmitted by the surfaces *ed* and *ej* may be changed by increasing or decreasing the density of the partial coating of silver. By the process which I employ of depositing the silver upon the prisms by electro-deposition, the density of the silver coating may be very accurately controlled.

Since the light received from the objective is broken up into three components and from each of these components a proportion of the light is cut off by means of the color filters, it is necessary that the objective be illuminated with greater intensity of light than is required for ordinary motion picture photography, or, if this is not feasible, compensation must be made in the size of the lens aperture or in the kind of film used. With the high speed film at present available, motion pictures may readily be taken at the usual speeds and with the customary illumination.

It will be noted that the exposures are made upon the film at spaced intervals. The space between the film which is not utilized for one exposure is, however, utilized in subsequent exposures. The width of the portion of the film exposed is, in the embodiment of my invention illustrated herein, substantially equal to the width of the space between the exposed portions. Thus, considering the portions of the film upon which an exposure may be made to be numbered consecutively, the first exposure will be made upon the portions numbered 1, 3 and 5. The film will then be fed a distance substantially equal to the width of three of these portions of the film, and the next exposure made upon the portions 4, 6 and 8. The third exposure will be made upon the portions 7, 9 and 11, and the fourth exposure upon portions 10, 12 and 14, and so forth. The negative produced by the camera herein described may, of course, be used to print positive films which may be projected by means of any suitable apparatus such, for example, as that disclosed in my co-pending application, Serial No. 607,922, filed April 28, 1932 except that the projector disclosed in said application must be modified to provide for a film feeding mechanism capable of feeding the film at a higher speed.

By making three records of each exposure through the red, green and blue filters, respectively, the natural colors may be reproduced from the film with a high degree of faithfulness.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. The combination with a three-color camera and a lens, of a compound prism block for separating light from the lens into three components, said block comprising a plurality of transmitting prisms and a pair of similar reflecting right prisms having quadrilateral bases and parallel end faces, one of said reflecting prisms being positioned adjacent to the lens with its outer end face perpendicular to and intersected by the focal axis of the lens, the other of said reflecting prisms positioned in line contact with the inner side face of the first reflecting prism and its outer end face perpendicular to and intersected by said focal axis, the inner end faces of said reflecting prisms lying outside of and on opposite sides of said focal axis, the outer side face of each of said reflecting prisms being silvered to provide a perfect reflector, the inner side face of each of said reflecting prisms being silvered to provide a partial reflector, a transmitting prisms filling the space between the outer end face of the inner reflecting prism and the adjacent inclined face of the outer reflecting prism, a rectangular transmitting prism having one side face covering the inner end face of the outer reflecting prism, and a third transmitting prism positioned in and filling the space between said rectangular prism and the inner reflecting prism.

2. The combination with a three-color camera and a lens, of a compound prism block for separating light from the lens into three components, said block comprising a plurality of transmitting prisms and a pair of similar reflecting right prisms having quadrilateral bases and parallel end faces, a thin layer of transparent binding material connecting the contiguous faces of said prisms, one of said reflecting prisms being positioned adjacent to the lens with its outer end face perpendicular to and intersected by the focal axis of the lens, the other of said reflecting prisms being positioned in line contact with the inner side face of the first reflecting prism and its outer end face perpendicular to and intersected by said focal axis, the inner end faces of said reflecting prisms lying outside of and on opposite sides of said focal axis, the inner side face of each of said reflecting prisms being inclined to said focal axis at an angle of approximately 45° and silvered to provide a partial reflector, the outer side face of each of said reflecting prisms being inclined to said focal axis at an angle greater than the angle of inclination of its inner side face and silvered to provide a perfect reflector, a transmitting prism filling the space between the outer end face of the inner reflecting prism and the adjacent inclined face of the outer reflecting prism, a rectangular transmitting prism having one side face covering the inner end face of the outer reflecting prism, and a third transmitting prism positioned in and filling the space between said rectangular prism and the inner reflecting prism.

3. The combination with a three-color camera and a lens, of a compound prism block for separating light from the lens into three components, said block comprising a plurality of transmitting prisms and a pair of similar reflecting right prisms having quadrilateral bases and parallel end faces, a thin layer of transparent binding material connecting the contiguous faces of said prisms, one of said reflecting prisms being positioned adjacent to the lens with an end face perpendicular to and having its center intersected by the focal axis of the lens, the other of said reflecting prisms being slightly larger than and positioned in line contact with the inner side face of the first reflecting prism with its outer end face perpendicular to and intersected by said focal axis, the inner end faces of said reflecting prisms lying outside of and on opposite sides of said focal axis, the inner side face of each of said reflecting prisms being inclined to the focal axis at an angle of 45° and silvered to provide a partial reflector, the outer side face of each of said reflecting prisms being inclined to said focal axis at an angle of 53° 25' and silvered to provide a perfect reflector, a transmitting prism filling the space between the outer end face of the inner reflecting prism, and the adjacent face of the outer reflecting prism, a rectangular transmitting prism having one side face covering the inner end face of the outer reflecting prism and its other side face in alignment with the adjacent end face of the other reflecting prism, and a third transmitting prism positioned in and filling the space between said rectangular prism and the inner reflecting prism with its inner face in alignment with the inner faces of said right prisms and inner reflecting prism.

CHARLES LEO FITZ.